United States Patent [19]
Greenspun

[11] Patent Number: 5,964,298
[45] Date of Patent: Oct. 12, 1999

[54] INTEGRATED CIVIL ENGINEERING AND EARTHMOVING SYSTEM

[75] Inventor: Philip Greenspun, Melrose, Mass.

[73] Assignee: GigaNet, Inc., Concord, Mass.

[21] Appl. No.: 08/259,252

[22] Filed: Jun. 13, 1994

[51] Int. Cl.$^6$ .............................. G06F 165/00; E02F 3/76
[52] U.S. Cl. .............................. 172/4.5; 172/811; 701/50
[58] Field of Search .................................. 172/811, 824, 172/4.5; 364/424.07; 701/50

[56] References Cited

U.S. PATENT DOCUMENTS

| | | | |
|---|---|---|---|
| 3,935,645 | 2/1976 | Okamoto et al. | |
| 4,282,933 | 8/1981 | Suganami et al. | 172/4.5 |
| 4,807,131 | 2/1989 | Clegg | 172/4.5 X |
| 4,818,107 | 4/1989 | Ono et al. | |
| 5,174,385 | 12/1992 | Shinbo et al. | 172/4.5 |
| 5,375,663 | 12/1994 | Teach | 172/4.5 |
| 5,471,391 | 11/1995 | Gudat et al. | 364/424.07 |
| 5,477,459 | 12/1995 | Clegg et al. | 364/424.07 |
| 5,519,620 | 5/1996 | Talbot et al. | |

*Primary Examiner*—Christopher J. Novosad
*Attorney, Agent, or Firm*—Cesari & McKenna, LLP

[57] ABSTRACT

An integrated earth contouring system uses a postioning system such as a GPS system to track the location of an earthmover on a work site. A display device visible to a driver of the earthmover displays a difference between an existing surface contour and a desired surface contour of the work site. The display device may show a three-dimensional image which rotates or a two-dimensional image having a cursor which rotates to represent the earthmover. A blade sensor tracks the position of the earthmover blade, and the display is updated to show changes in the existing surface contour when the earthmover is moved on the site with the blade height between the height of the existing surface and the height of the desired surface. An orientation sensor on board the earthmover provides the microprocessor with the orientation of the earthmover, and a memory unit is provided to allow storage and retrieval of surface data by the microprocessor. The system can integrate the tracking of earthmover activity and surface development, as well as a utility line avoidance feature and a hydrology analysis function.

12 Claims, 4 Drawing Sheets

INTEGRATED CIVIL ENGINEERING AND EARTHMOVING SYSTEM

BACKGROUND OF THE INVENTION

Construction is the largest industry in many countries. Nearly all construction jobs entail some sort of earthmoving. However, a significant amount of time and money is lost due to the inefficiency of having operators of heavy machines, such as bulldozers, attempt to reshape the surface of a work site having only the initial measurements to go on. The high cost of renting the heavy machines results in an enormous amount being spent due to delays.

Other time losses are encountered in construction during the initial "staking out" of the site. Surveyors must drive stakes into the ground at various locations around the site to indicate to the earthmover operator where and how much to cut from the surface of the site. This process is slow and time-consuming. In addition, the driver of the earthmover must be skilled in working with reference to the stakes.

In nearly all cases, the proposed manner of moving dirt on a construction site is planned out in advance. However, as the earthmoving begins, and the surface of the site begins to change shape, new measurements must be taken and the plan for distribution of the existing site earth must be updated. Using conventional methods, there is simply no way to avoid the delays necessary to make the proper modifications.

One additional problem which arises during construction is the danger involved with operating a backhoe or other piece of heavy equipment near utility lines. Operators have been injured or killed from accidentally striking gas or other utility lines. Without a more reliable method of gauging the location of an earthmover relative to existing utility lines, the occurance of such accidents is likely to continue.

SUMMARY OF THE INVENTION

An earthmoving system according to the present invention uses a locator system such as the global positioning system (GPS) to track the location of earthmoving equipment, such as a bulldozer and, in particular, the blade of the equipment. In the context of this application, the term "GPS" will be applied generically to positioning using satellite data, and is not considered limited to the particular satellite system known as the "Global Positioning System." Furthermore, the invention contemplates the use of navigation systems other than satellite systems, such as earth-based laser beacons or RF location systems.

The storing and retrieving of image data representative of surfaces is well-known in the art of computer modelling. In the present invention, a display device, such as a video monitor, is provided within the cab of the earthmover where it is visible to the operator. The display device displays to the operator an image which provides information as to the existing and desired surfaces of the work site. Both the existing and the desired surface contours may be shown simultaneously or, alternatively, the difference between the two may be shown. For example, the display device might depict a three-dimensional image of a spatial volume which separates the existing contour from the desired contour.

As the contour of the site changes (i.e. as the earthmover relocates the earth on the site) the portion of the display indicative of the existing surface also changes. Thus, if the display representation is a three-dimensional volume, that displayed volume will be reduced as the earthmover relocates the earth on the site. This allows the operator to be continually informed as the contour of the site changes. The operator of the earthmover may thus govern his work on the site in accordance with changes in the surface contour.

In order to determine the changes in the contour of the site, the position of the blade of the earthmover is tracked as the earthmover moves throughout the site. As long as the blade is in contact with the ground, the height of the blade is also the height of the ground at that point. Thus, as the work is accomplished, the surface contour displayed on the display device is updated to show the level of the existing surface as being altered in the region that the earthmover has traversed.

Tracking the height of the blade could be accomplished by locating a GPS receiver on the blade itself. However, due to the harsh environment of the blade, it is preferable to mount a GPS receiver on the cab of the earthmover, and to provide a sensor which senses the position of the blade relative to the height of the cab. Thus, using the location of the earthmover as determined by the GPS system, and the relative position difference between the cab and the blade, the actual height of the blade is established.

In the preferred embodiment of the invention, a differential GPS system is used in order to provide maximum position accuracy. It is therefore necessary to have two separate GPS receivers, the positions of which are used in a differential calculation to determine the position of the GPS receiver located on the earthmover cab relative to a reference position at the work site. Typically, the second GPS receiver is located in a fixed position relative to the site. A microprocessor is used to make the GPS differential calculation and to update the recorded surface contour.

On-board the earthmover is an orientation sensor such as a compass which generates a signal indicative of the orientation of the earthmover. For a three-dimensional image, this information can be used to update the image on the display as the earthmover rotates. Specifically, the image on the display can be from the point of view of the front of the earthmover, or the entire work site can be shown with a cursor indicating the relative location and orientation of the earthmover. Since the GPS receiver is preferably not located on the earthmover blade, the compass signal is used in conjunction with the GPS system to provide the desired data regarding the position and orientation of the earthmover blade.

Because wireless communication is required between the earthmover and the stationary GPS receiver, a pair of RF transceivers is preferably used, one on the earthmover and one at the stationary position. This allows the transmission of position and image data between the earthmover and the fixed location. An input port to the microprocessor is also provided to which an input device may be connected, allowing the input of initial surface data.

DETAILED DESCRIPTION OF A PREFERRED EMBODIMENT

Figure 1:
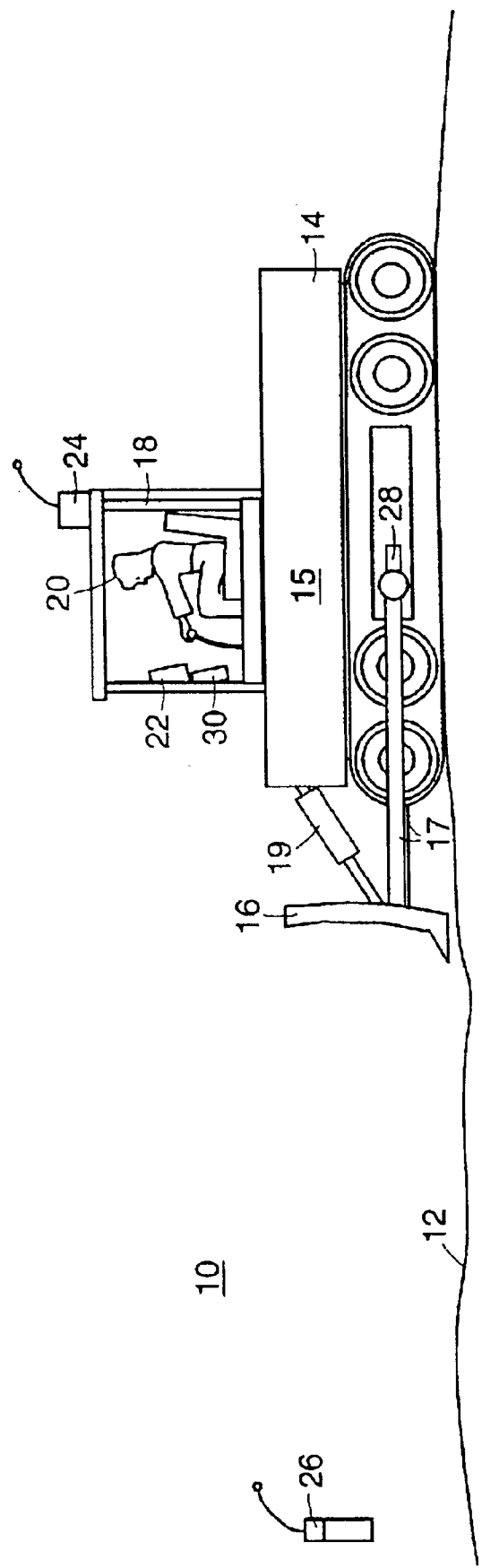
FIG. 1 is an overview of a typical site using the earth contouring system of the present invention.

Shown generally in FIG. 1 is a construction site 10. The site 10 may be, for example, an undeveloped parcel of land on which various structures are to be erected. Within the site 10, the earth 12 has a particular contour which must be modified before construction of the structures may begin.

To make the necessary changes to the surface contour, an earthmover 14, in this case a bulldozer, is used to strip earth from the surface 12 in some portions of the site and redistribute the earth either off the site or to regions of the site where it is necessary to build up the height of the surface 12. The earthmover 14 has a body portion 15 and a cab 18 which sits atop the body portion 15. A blade 16 is attached to the earthmover 14 by conventional means, in this case by pivoting connecting arms 17 and hydraulic cylinders 19. Operation of the cylinders 19 allows the blade to be raised up or down relative to the body 15 of the earthmover 14.

Within the cab 18 of the earthmover 14 sits an operator 20 who controls the operation of the earthmover. In accordance with the present invention, a display device 22, in the form of an LCD or a CRT video monitor, is located within the cab 18 where it can be viewed by operator 20. The display device 22 is controlled by a microprocessor 41 and provides information to operator 20 regarding the desired surface contour of the site 10 and the relative location and height of the earthmover blade 16. The information provided by display device 22 allows the operator 20 to quickly and efficiently proceed with the earthmoving tasks required on the site.

In the preferred embodiment, the display device 22 displays an image which, in essence, depicts the difference between the desired contour of the site and the existing contour. The image of the surfaces provides the operator with a comprehensive picture of the earth which must be moved and the locations on the site to and from which it must be moved.

To allow the operator 20 to know his location relative to the displayed surfaces, the image displayed on the display device 22 changes as the earthmover moves. The manner in which the image changes depends on whether the image being displayed is a three-dimensional or a two-dimensional image. These images and the manner in which they change are described in more detail below. Also displayed to the operator 20, either on the display device 22 or on a separate gauge, is information indicating the height of the bottom of blade 16 relative to the desired surface contour at the location of the blade. In this description, reference to the height of the blade refers to the height of the bottom of the blade.

To generate the desired images on the display device 22, control circuitry provides image data to the display device 22. Referring to the block diagram of FIG. 2, in conjunction with FIG. 1, the heart of the control circuitry are the communicating microprocessors 32 and 41. The microprocessor 41 generates the image data for display device 22 in response to updated image data inputs from microprocessor 32. This data is updated in response to inputs containing information from a number of sources. The microprocessor 32 has access to a memory unit 34, in which image data is stored.

After surveying of the site and planning of the desired site contour, an input device 36 is used to input data describing the existing surface contour and the desired surface contour to the microprocessor 32, which then stores the information in memory unit 34. This data is then used by the microprocessors 32, 41 to generate the surface images for the display device 22.

In order to determine the location of the earthmover 14, microprocessor 41 receives an input from a first GPS receiver 24 which is located on the earthmover 14 and transmits it to microprocessor 32. Although a GPS locater system is preferred, it should be understood that other types of positioning systems may be used instead. The GPS receiver 24 is a commercial GPS receiver as is commonly understood in the global positioning art. In FIG. 1, the GPS receiver 24 is shown located on the top of cab 18, but it will be understood that the receiver may be located anywhere having a fixed location relative to the body 15 of earthmover 14.

A second GPS receiver 26 is located in a fixed position relative to the site 10, and provides inputs to microprocessor 32. In the preferred embodiment, the memory unit is located at the fixed location of GPS receiver 26, and GPS data and image data are transmitted between the fixed location and the earthmover 14 via RF transceivers 27, 29. Thus, all of the data storage is preferably done at the fixed location. It is also preferable that the microprocessor 32 does all the surface calculations at the fixed location, while the microprocessor 41 drives the display device 22 and communicates with microprocessor 32.

Transceiver 27 receives position data which is transmitted from the earthmover 14 by transceiver 29. This data is input to microprocessor 32 which, in turn, generates updated image data. The image data is transmitted by transceiver 27 to transceiver 29, which inputs it to microprocessor 41. Although an RF transceiver pair is specified for this embodiment, any wireless method of transmitting the data from GPS receiver 26 to microprocessor 32 may be employed.

The use of two GPS receivers 24, 26 allows the system to use a differential GPS technique, known to those skilled in the art of global positioning. Since the position of GPS receiver 26 relative to the site 10 may be predetermined, the position of the non-stationary GPS receiver 24 relative to the site can be ascertained with a high degree of accuracy by the differential GPS technique. The accuracy is due to the fact that the errors a GPS receiver makes are consistent over relatively small areas. Since construction sites are typically no larger than a few square miles, the technique is sufficient. Thus, the position of GPS receiver 24 (and therefore of earthmover 14) can be tracked relative to the stored surface data.

Figure 2:
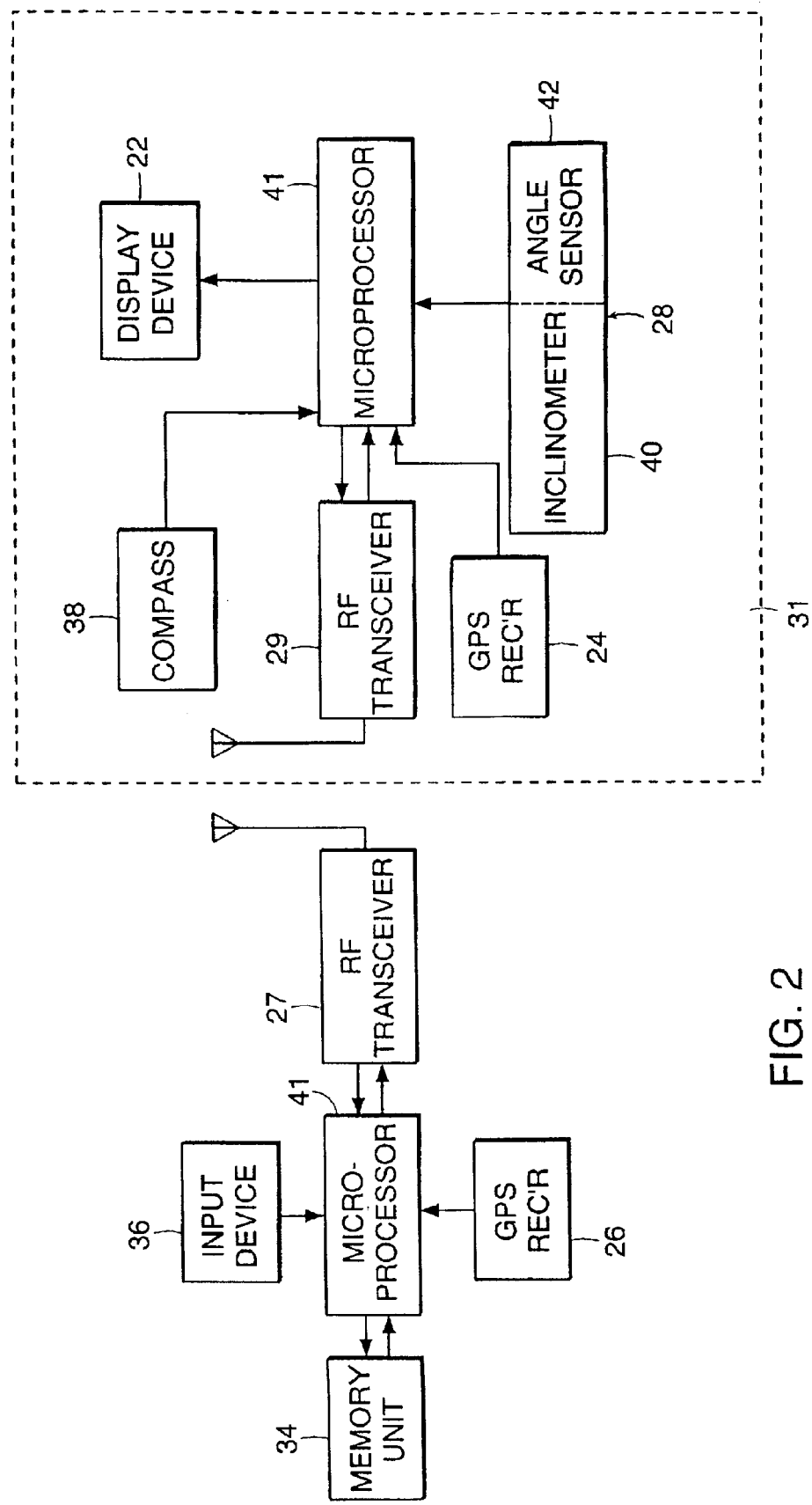
FIG. 2 is a block diagram of an earth contouring system according to the present invention.

Also shown in FIG. 2 is a blade sensor 28 which is used to determine the location of blade 16 relative to the body 15 of earthmover 14. Although GPS receiver 24 could perhaps be located in a fixed position relative to blade 16, the harsh environment facing blade 16 makes this location undesirable. Instead, the preferred embodiment has GPS receiver 24 fixed relative to the body 15 of earthmover 14, and blade sensor 28 senses the position of blade 16 relative to the body 15.

The blade sensor of the present invention may be any type of system capable of locating the blade 16 absolutely or with reference to the earthmover body 15. However, as indicated in FIG. 2, in the preferred embodiment the blade sensor 28 consists of at least two different sensors located on the pivoting arms of the earthmover which cause the blade to move in a rotational direction relative to the body of the earthmover. It will be understood that other types of conventional sensors may be substituted to accomodate earthmovers having blades controlled in a different manner.

First, an inclinometer, which has its position fixed relative to body 15 of earthmover 14, is oriented to measure the absolute tilt of the earthmover body 15 from front to back relative to a flat surface. In conjunction with the inclinometer 40, an angle sensor 42 is provided which determines the angle between blade shafts 17 and a fixed longitudinal axis running from the front to the back of the body 15 of earthmover 14. Thus, the blade sensor 28 provides inputs to microprocessor 41 indicative of the angle of body 15 relative to the earth and the angle of body 15 relative to blade shafts 17. This information is then forwarded to microprocessor 32. With this information and the information as to the location of the earthmover 14 (provided by the GPS receivers 24, 26) the microprocessor 32 may determine both the height of blade 16 and the lateral location of the blade.

It is important to know the height of the earthmover blade 16, because the display 22 is updated based on movement of the earthmover blade. The two regions of interest are those where the existing surface is higher than the desired surface (requiring cutting), and those where the existing surface is lower than the desired surface (requiring filling). The locations of these regions are determinable by the microprocessor 32 through comparison of the two surfaces. When the blade is lower than the existing surface, microprocessor 32 will always interpret movement of the earthmover as changing of the surface and thus requiring updating of stored surface data. However, where filling is required, operator control is desirable to specify when earth is actually being pushed into the low region. This is due to the fact that the driver may be driving over the low region with the blade 16 elevated above the existing surface without pushing earth into the low region. Therefore, a manual control 43 is provided which allows the operator 20 to disengage the surface contour modification function of the present invention when he is simply driving the earthmover over the low region without pushing earth into the region. Microprocessor 41 responds to the disengage input by signalling microprocessor 32 to discontinue modification of the stored existing surface.

When the surface contour modification function is not disengaged, the act of driving the earthmover 14 over the low regions creates a presumption that earth is being distributed underneath the blade at the height of the bottom of the blade. Therefore, just as with cutting, the height of the blade for the region over which the earthmover 14 travels becomes the height of the existing surface. When the operator 20 has driven the earthmover 14 across all regions of the site 10 with the blade 16 at a height equal to that of the desired surface (and without the surface modification function disengaged) the existing surface will have been modified to equal the desired surface, and the earthmoving task will be complete. The site should then have a surface contour approximately equal to the desired contour.

Because the GPS data is not sufficient to determine the rotational orientation of GPS receivers 24, 26, it is desirable to add an orientation detector such as magnetic compass 38 to the on-board system for tracking the absolute orientation of earthmover 14. As shown in FIG. 2, the compass provides an input to microprocessor 32 which will change as the orientation of earthmover 14 changes. Depending on the display mode, the change in orientation relative to the surfaces will be depicted on display device 22 by either a rotation of the surface images or a rotation of a cursor representative of the relative location of earthmover 14.

In one alternative embodiment, three GPS receivers are located in different places on the earthmover in order to provide enough data to determine the roll, pitch and yaw of the earthmover. This embodiment may become more desirable as the cost of accurate GPS systems becomes less prohibitive.

Figure 3:
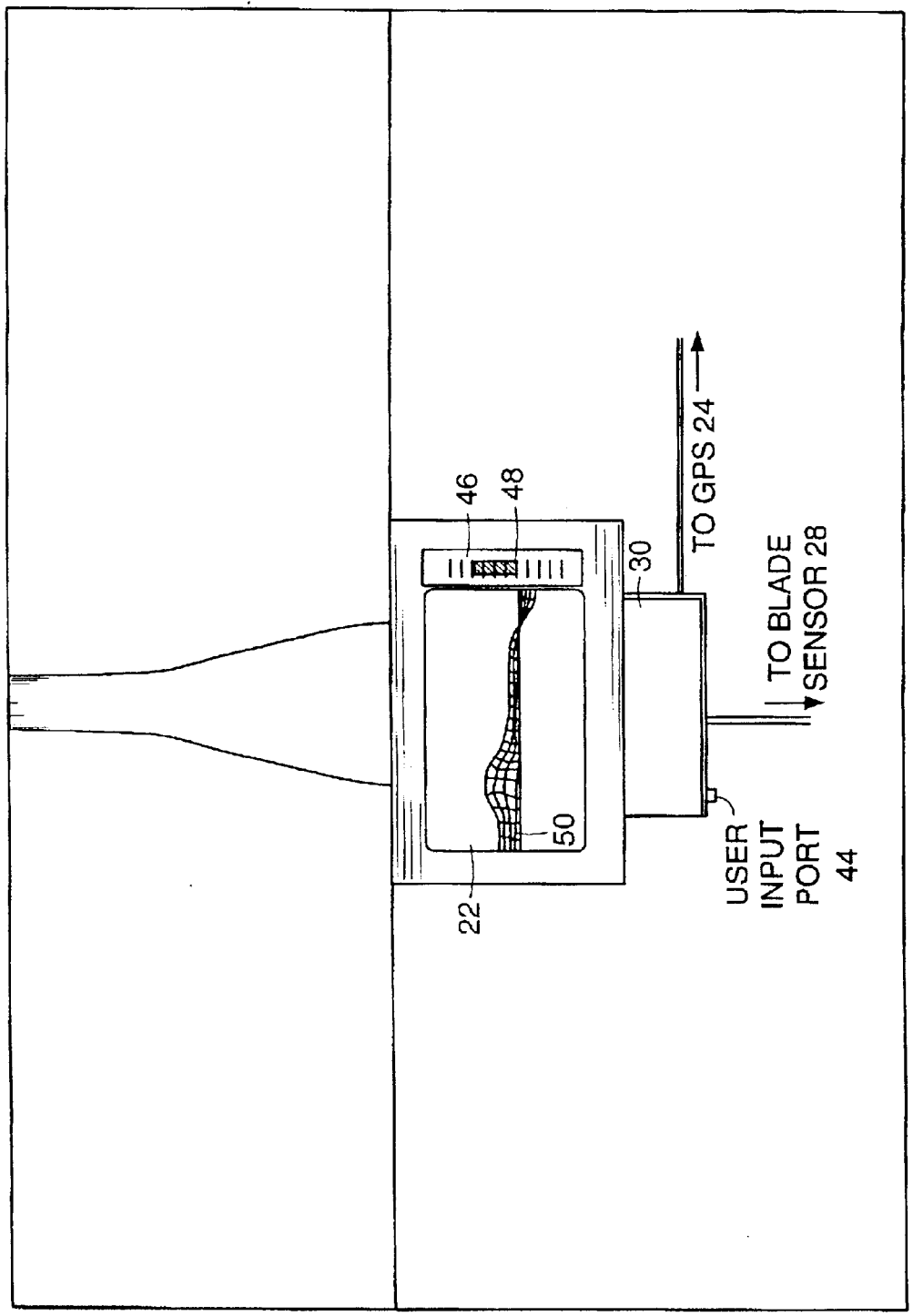
FIG. 3 is a view of the interior of a typical earthmover cab showing a portion of one embodiment of the present invention.

FIG. 3 shows the display device 22 as seen from the interior of cab 18 of earthmover 14. The display device 22 is mounted in the cab with on-board components located nearby. In the preferred embodiment, only the necessary elements of the invention are kept on board the earthmover. These include the microprocessor 41, display device 22, GPS receiver 24, blade sensor 28, compass 38, manual control 43 and RF transmitter/receiver 29. These components are shown in FIG. 1 in various locations around the cab 18. The microprocessor 41 and compass 38 are preferably located in a protective container 31. It should be understood that the components need not be located in the positions shown in FIG. 1, but may be anywhere in a fixed position relative to the earthmover 14.

While microprocessor 41 moves with the earthmover, microprocessor 32 remains at the fixed location on the work site. The fixed location can be a monitoring station the work site, and a local monitor 33 which receives image data from microprocessor 32 is preferably provided from which a supervisor can observe the progress of the earthmover.

Referring again to FIG. 3, in the earthmover cab, along with displayed image data on display device 22, a blade height gauge 46 is provided which shows the height of the earthmover blade 16 relative to the height of the desired surface beneath the blade. In the present embodiment, the gauge 36 is a two-directional bar gauge which depicts blade height relative to a centerline 48 that is referenced to the desired surface height by microprocessor 32. In FIG. 3 the gauge 46 is shown as being located on display device 22. However, the gauge may be positioned anywhere in the operator's line of vision within the cab 18.

The minimum information which must be displayed to operator 20 is the height of the blade relative to the height of the desired surface at the blade location. However, as stated previously, the preferred embodiment displays an image of the difference between the existing surface contour and the desired surface contour, which is updated as the earthmover 14 is operated on the site. In the embodiment of FIG. 3, this information is displayed as a three-dimensional volume 50, which represents the volume of earth separating the existing surface contour and the desired surface contour. The image of the volume is created from one of two possible points of view.

A first possible three-dimensional image is looking forward from the point of view of the earthmover blade 16. That is, portions of the site located behind the earthmover blade 16 are omitted from the display. Thus, as the earthmover rotates, the image on display device 22 rotates about the effective point of view. As such, it is possible for the operator to rotate the earthmover 360° to get a panoramic view of the entire work site (as represented by the displayed image).

A second possible three-dimensional image is an image of the entire work site, with a cursor indicating the current location of the earthmover relative to the work site. In this instance, rotation of the earthmover relative to the work site can be shown in one of two ways, with either the surface image rotating about the cursor or the cursor rotating within the surface image.

Figure 4:
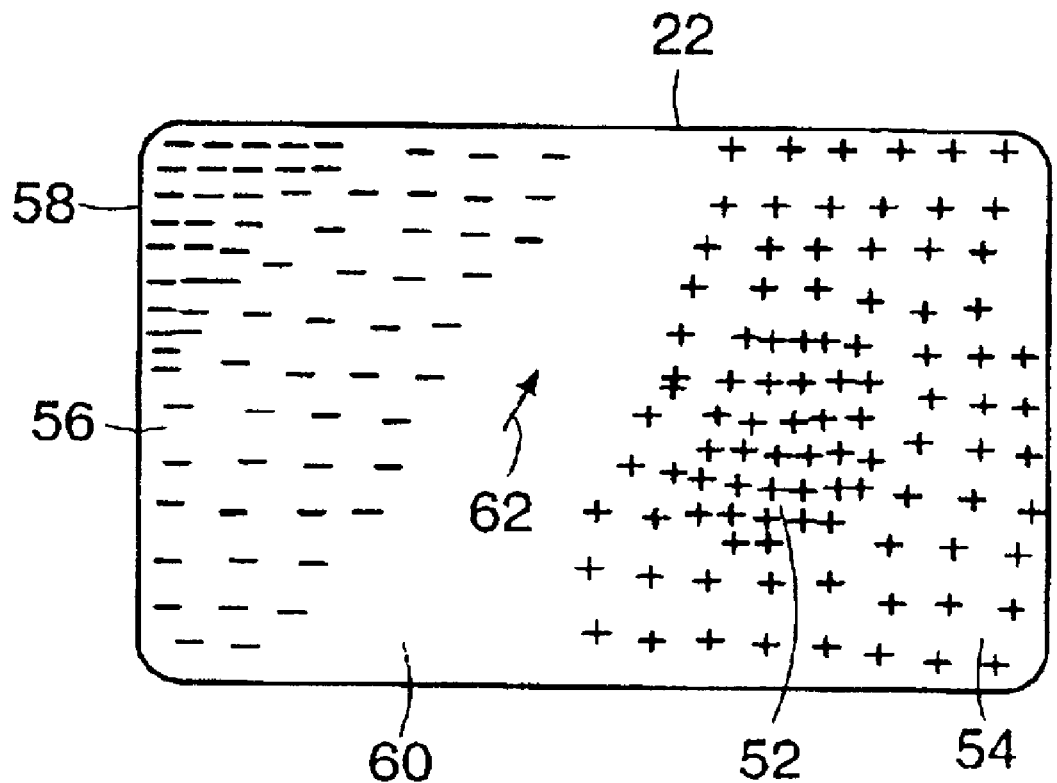
FIG. 4 shows an alternative type of display image for use with the present invention.

The three-dimensional image may be isometric or perspective. However, in some cases it may be desirable to display the surface data as a two-dimensional image. Shown in FIG. 4 is an alternative embodiment of the present invention which uses such a two-dimensional surface image, in this case a top view of site 10. In this embodiment, the difference between the existing surface contour and the desired surface contour is indicated in different portions of the image by the density of displayed pixels or characters. In the example of FIG. 4, addition (plus) signs are used to indicate regions where the existing surface is higher than the desired surface, and subtraction (minus) signs are used to indicate regions where the existing surface is lower than the desired surface.

In order to indicate distances between the existing surface contour and the desired surface contour on the image of FIG. 4, the density of the characters in a particular region is higher as the distance between the two surface contours increases. For example, a high density region 52 of addition signs indicates a part of the site where the existing surface contour is considerably higher than the desired surface contour. Similarly, a low density region 54 of addition signs indicates a region where the existing contour is higher than the desired contour, but lower than high density region 52. A low density region 56 of subtraction signs indicates a region where the existing contour is somewhat lower than the desired contour, while a high density region 58 of subtraction signs indicates a portion of the site where the existing contour is even lower still. A blank region 60 of the display indicates a portion of the site where the height of the existing contour matches the height of the desired contour.

It should be understood that the example of FIG. 4 is simplified in that only five different relative distances between the existing contour and the desired contour are displayed. While this facilitates the explanation of this embodiment, an actual implementation can involve many degrees of varying relative heights, and therefore many degrees of varying density of displayed characters or pixels. Using simple pixel density (as opposed to selected characters) would provide a gray scale, although some additional means would be required to distinguish low regions from high regions. With such a gray scale, a reference bar would be displayed showing the correlation between the shades of gray and their corresponding relative depths. A display device with a color screen may also be used, different colors representing different relative heights, and could be combined with a pixel density variation for higher resolution of relative distance. Of course, the display device could also be used to display a conventional contour map (as is commonly known in the art), the contours of which would be updated as the earthmover moved along the work site.

For the two-dimensional image embodiment, a cursor 62 is displayed on the display device 22 to indicate the location of earthmover 14. Preferably, the cursor is an arrow or other shape capable of indicating orientation as well as location. Thus, the position of the cursor 62 on the display screen indicates the location of the earthmover on the site, while the orientation of the cursor 62 relative to the display screen indicates the direction which the earthmover 14 faces. It should be recognized that the particular characters used to indicate relative height, and the shape used for cursor 62, may be varied without exceeding the scope of the invention.

While a bulldozer is used to describe the preferred embodiment of the invention, it should be recognized that other types of heavy equipment such as graders, frontloaders, backhoes, etc. are contemplated by the present invention. Any earthmover having a blade for cutting the earth may make use of the present invention, which tracks the location of the blade of the vehicle, regardless of its type. Well-known sensor technology may be used to extrapolate the exact position of the blade relative to a cab of the earthmover by detecting the movements of armatures which support the earthmover blade.

Those skilled in the art will also recognize that more that one earthmover using the present invention may be operating simultaneously on one site. A single integrated system may update the existing surface of the site using the inputs from multiple earthmovers. The same updated surface data would then be transmitted to each of the earthmovers. In this manner, a number of earthmoving vehicles, perhaps of different types, may be coordinated from one central location to provide fast and efficient development of the site.

Certain additional features which are individually known may also be incorporated into the present invention to make one integrated system. For example, information on the location of utility lines may be used in conjunction with the location system to determine when the earthmover blade is close to the lines. A three-dimensional model of the utility lines is stored in the system memory, and is compared to the location of the earthmover as the earthmover moves on the work site. An alarm is provided to alert the operator of the earthmover when the blade gets within a certain distance to a utility line. This type of alerting system may be used with the surface contouring system, or could be used by itself in any otherwise conventional digging operations. The signal indicating a close proximity to the lines could also be used for other purposes, such as automatically incapacitating the earthmover to prevent it from striking the lines.

Also useful to the present invention is the inclusion of a hydrology analysis feature for tracking the changing drainage paths of the work site. Such a feature indicates how water flows on the surface of the site given a particular surface contour. This information may aid in determining how the surface of the work site is to be changed in reaching the final desired surface. For example, if work is being done during rainy periods, it might be desirable to avoid the flooding of certain areas during construction. Hydrological analysis of day-to-day changes in the site surface would assist in modifying the construction plan to avoid such flooding.

Another feature of such an integrated system includes automatic record-keeping. The memory storage of the present invention may be implemented to allow the recording of various information to which a user may refer in the future. Such information could, for example, be downloaded onto a permanent storage medium, such as a magnetic disc, at the end of a day. Useful information which might be desired includes the history of the surface modifications. Since the system routinely generates updated surface data, each communication packet between the earthmover and the system host can be captured and stored in memory. Thus, the progression of the surface development can be easily reconstructed at a later time.

Information on the history of the earthmover itself might also be desirable in certain circumstances. The activity of the vehicle in developing a particular site can be of interest, particularly if more than one earthmover is used to develop a particular site, and one wished to ascertain the individual contributions of each. The maintenance records of each earthmover can also be combined with the present system to keep a running record of the hours of service of each earthmover, as well as when and to what extent the earthmover was serviced.

The features mentioned above may all be incorporated into the present invention, along with other known features, to form a single, integrated, civil engineering and earthmoving system. Such a system allows the centralizing of many of the construction-related tasks, while providing an efficient and practical method of tracking the development of a construction site.

While the invention contemplates the use of any applicable software and hardware systems for the generation and maintenance of surface data and other system data, certain aspects are particularly advantageous. For example, a preferred type of surface modelling is to use the known method of constrained Delaunay Triangulation in constructing the surfaces. This method gives much more accuracy than a rectangular grid in important portions of the site, while requiring less overall memory. This preserves the accuracy of interpolation such that data from outside the earthmover's cut-path is not mixed with data from underneath the blade.

The system also requires many geometric computations. It is therefore preferred to use exact arithmetic (e.g. rational numbers and arbitrarily large integers) as opposed to floating point arithmetic. LISP is one example of a programming language which allows the use of exact arithmetic. By using exact arithmetic, the errors associated with floating point arithmetic are avoided.

It is also desirable to provide the system with automatic memory storage allocation, as is known in the art of computer architecture. In such a system, a common standard is used by a memory reallocation program to determine which memory locations are no longer in use. These memory locations are then reallocated for other uses. Since manual reallocation is unpredictable, and may result in the accidental reallocation of a memory location which is still in use, automatic allocation is preferred.

A number of the well-known computer software and hardware features which are discussed above for use in the preferred embodiment are described in "SITE CONTROLLER: A System for Computer-Aided Civil Engineering and Construction" by Philip Greenspun (and references cited), published as MIT Articifical Intelligence Laboratory Technical Report 1408, and catalogued in the Massachusetts Institute of Technology library.

One notable alternative embodiment for the present invention outside the construction field is its use in strip mining. In strip mining, maps are constructed which show the location and depths of coal seams in the earth. Given this information, a "desired surface" is easily constructed which, if achieved by an earthmover doing the stripping, would optimize the removal of the coal. It should be understood that the invention as described above is perfectly suitable for such a use.

The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An earth-contouring system for modifying the surface contour of a work site, said system comprising:
   A. an earthmover having a body and an earthmoving blade;
   B. a positioning system for determining the position of the blade relative to the work site;
   C. a display device on the earthmover for generating a display image, viewable to an operator of the earthmover, which indicates the difference between the existing contour of the surface of the work site and the desired contour of the surface of the work site at the location of the earthmoving blade; and
   D. computing means located at a fixed position relative to the work site, responsive to the positioning system, for calculating the information for the display and transmitting the information to the display device on the earthmover.

2. An earth-contouring system according to claim 1 wherein the positioning system comprises
   i. a first GPS receiver on the earthmover; and
   ii. a second GPS receiver having a fixed location relative to the work site.

3. An earth-contouring system according to claim 2 further comprising a microprocessor in said computing means which stores and retrieves data from the data storage unit and responds to the blade sensor and said first and second GPS receivers to store updated data in the data storage unit.

4. An earth-contouring system according to claim 3 further comprising an RF transceiver pair for transmitting data between the earthmover and the work site.

5. An earth-contouring system according to claim 1 wherein the display image generated by the display device indicates a difference between the existing contour of the surface of the work site and the desired contour of the surface of the work site for a predetermined area of the work site within which the earthmover is located.

6. An earth-contouring system according to claim 5 wherein the display image generated by the display device comprises an individual representation of each of the existing surface and the desired surface.

7. An earth-contouring system according to claim 1 further comprising a data storage unit in said computing means for storing data representing the difference between said existing contour of the work site surface and said desired contour of the work site surface.

8. An earth-contouring system according to claim 7 wherein the earthmoving blade moves relative to the earthmover body, and the system further comprises a blade sensor which senses the position of the blade relative to a fixed position on the body of the earthmover.

9. An earth-contouring system according to claim 8 wherein the blade sensor comprises an inclinometer which senses the inclination of a longitudinal axis of the body of the earthmover.

10. An earth-contouring system according to claim 8 wherein the blade sensor comprises an angular sensor which detects the angle between a longitudinal axis of the body of the earthmover and a longitudinal axis of a connecting arm which attaches the blade to the earthmover body.

11. An earth-contouring system according to claim 10 further comprising an orientation sensor, on the earthmover, which senses an angular orientation of the earthmover.

12. An earth-contouring system for modifying the surface contour of a work site, said system comprising:
   (A) a plurality of earthmovers each of which has a body and an earthmoving blade;
   (B) a positioning system for determining the position of each of said blades relative to the work site;
   (C) a display device on each earthmover for generating a display image viewable to an operator of the earthmover which indicates the difference between the existing contour of the surface of the work site and the desired contour of the surface of the work site at the location of the blade of the earthmover; and
   (D) computing means located at a fixed position relative to the worksite, responsive to the positioning system, for calculating the information for the displays and transmitting the information to the display devices on the earthmovers.

\* \* \* \* \*

UNITED STATES PATENT AND TRADEMARK OFFICE
CERTIFICATE OF CORRECTION

PATENT NO.   : 5,964,298
DATED        : October 12, 1999
INVENTOR(S)  : Greenspun It is certified that error appears in the above-identified patent and that said Letters Patent is hereby corrected as shown below:

On the title page, item [73] Assignee: "GigaNet, Inc., Concord, Mass" should be deleted.

Signed and Sealed this

Twenty-third Day of May, 2000

*Attest:*

Q. TODD DICKINSON

*Attesting Officer*     *Director of Patents and Trademarks*